United States Patent [19]

von Taschitzki

[11] 4,311,117

[45] Jan. 19, 1982

[54] ANIMAL DRINKING FOUNTAIN

[75] Inventor: Rainer von Taschitzki, Cologne, Fed. Rep. of Germany

[73] Assignee: Aratowerk Walter von Taschitzki, Fed. Rep. of Germany

[21] Appl. No.: 147,790

[22] Filed: May 8, 1980

[30] Foreign Application Priority Data

May 9, 1979 [DE] Fed. Rep. of Germany ....... 2918661

[51] Int. Cl.³ .............................................. A01K 7/00
[52] U.S. Cl. .................................................... 119/75
[58] Field of Search ............................... 119/75, 72.5; 222/402.24, 402.14, 402.1

[56] References Cited

U.S. PATENT DOCUMENTS 3,044,446  7/1962  Vanderhoven ................. 119/75
3,289,635  12/1966  Eagles ............................. 119/75
3,498,269  3/1970  von Taschitzki ................ 119/75
3,646,955  3/1972  Olde ................................. 119/75
3,698,431  10/1972  Thompson ..................... 119/72.5

Primary Examiner—Jay N. Eskovitz
Attorney, Agent, or Firm—Neil F. Markva

[57] ABSTRACT

The animal drinking fountain includes an elongated tap housing having a bore with a liquid inlet opening and a spring-loaded plunger movably disposed between an open and a closed position within the housing. A valve operating lever is pivotally mounted on the tap housing to engage the valve plunger. A valve seating carrier is disposed between the valve plunger and the liquid inlet and opening of the housing. A sealing mechanism is disposed between the valve plunger and the valve seat on the valve seating carrier to seal the open bore which faces toward the valve plunger. The sealing assembly includes a spacer or a valve basket non-rotatably supported on and axially displaceable with respect to the valve seating carrier.

13 Claims, 4 Drawing Figures

ANIMAL DRINKING FOUNTAIN

FIELD OF INVENTION

This invention relates to an automatically operable watering device or drinking fountain for domesticated animals. A hollow bored stem is supported under spring action within an elongated watering tap housing. A sealing member is pressed against a valve seat under the spring action in a direction opposite to that of the pressurized liquid flow. A toggle lever is articulated at the end of the tap housing and acts on the free end of the stem. Animals actuate the toggle lever by placing their mouths thereover to open the valve and receive the pressurized liquid directly into their mouths.

BACKGROUND OF THE INVENTION

This invention constitutes an improvement over my earlier drinking fountain as disclosed in U.S. Pat. No. 3,498,269. In this known device, the valve seat is mounted at a specific point within the tap housing. When manufacturing tolerances occur within the construction of the known tap housing such as the valve plunger or stem, the lever or the spring action, it is quite involved to make the appropriate adjustment to correctly establish the position and power for a safe valve closure. Additionally, the end of the spring-loaded valve plunger or stem directed toward the valve seat acts as a sealing member which shuts off the water flow by pressing against the valve seat. The valve-seat end of the stem is removed from the valve seat when actuated by the toggle lever, thereby causing water to flow under pressure through the valve housing. It is advantageous for the valve plunger or stem to be rotatable about its own axis, thereby avoiding any wear which might result from concentrated action of the lever arm on a specific point of the free end of the valve stem or plunger. However, wear is caused at the valve seat of the valve plunger or stem due to such rotation. Consequently, the sealing action at the end of the valve stem is reduced, and operating reliability of the device is affected accordingly.

SUMMARY OF THE INVENTION

The primary object of the invention is to provide an automatically operable drinking fountain which obviates the problem associated with known drinking fountains by obtaining a higher operating reliability and requiring a lower production expenditure.

The drinking fountain as described herein includes a stopper mechanism or valve seat carrier which is secured in a fixed position within the bore of the tap housing. At one end of the stopper mechanism is a cylindrical piston which slidingly engages the bore of the tap housing. A valve seat is located at the other end of the stopper mechanism and faces in a direction toward the spring-loaded valve plunger or stem. A sealing means is disposed between the spring-loaded plunger and the valve seat of the stopper mechanism. The sealing means includes a spacer means which is non-rotatably supported within the bore of the tap housing and axially movable therein. The sealing means includes a sealing member which is disposed adjacent the valve seat and received by the spacer means.

Another feature of the invention includes the structural configuration of the stopper mechanism or valve seat carrier as an independent screw member having a threaded portion along its largest diameter. A further feature of the invention includes an annular groove disposed adjacent to the threaded portion thereof and extending around the piston end of the stopper mechanism. A sealing ring is disposed in the annular groove and prevents undesired secondary flow around the outside of the piston.

The valve seat carrier or stopper mechanism includes a polygonal valve seating section extending in a direction toward the valve plunger or stem. The spacer means comprises a valve basket having as many extensions as the valve seating section has planar side surfaces. Thus, the spacer means includes an element shaped like a valve cage which is axially guided through its extensions on the planar side surfaces of the valve seating section. Thus, the sealing means is disposed between the plunger and the valve seat carrier and remains continually fixed in the same position with respect to the valve seat. Wear is thereby eliminated and service life of the fountain is considerably lengthened.

Another feature of the invention includes a cylindrical shaft portion for the valve plunger or stem. The cylindrical shaft portion is in sliding contact with the bore of the tap housing and provides safe guidance of the valve plunger and avoids canting of the plunger at the location of the sealing means. Consequently, tolerances of the movable parts may be kept within narrow limits. At the same time, the cylindrical shaft portion provides an abutment for a spring which finds its support at the valve casing inside the tap housing bore.

The reliable operation of the watering tap or drinking fountain requires an efficient adjustment of the valve plunger. The animals must bite at the lower elbow lever to open the valve. Thus, very considerable forces may be exerted on the lever bearing because of the powerfully constructed chewing muscular systems of animals which have obtained full growth. It is necessary to distribute these large forces over as large a surface area as possible. Thus, another feature of the invention provides that the elbow lever acting on the free end of the valve stem is supported on a threaded bolt having two ends which are formed as journals of different diameters. Furthermore, the two side pieces of the elbow lever have bearing eyes of corresponding different sizes. Thus, the screwed-together threads of the bolt in the tap end receiving same provide support over their full lengths.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DETAILED DESCRIPTION

Figure 1:
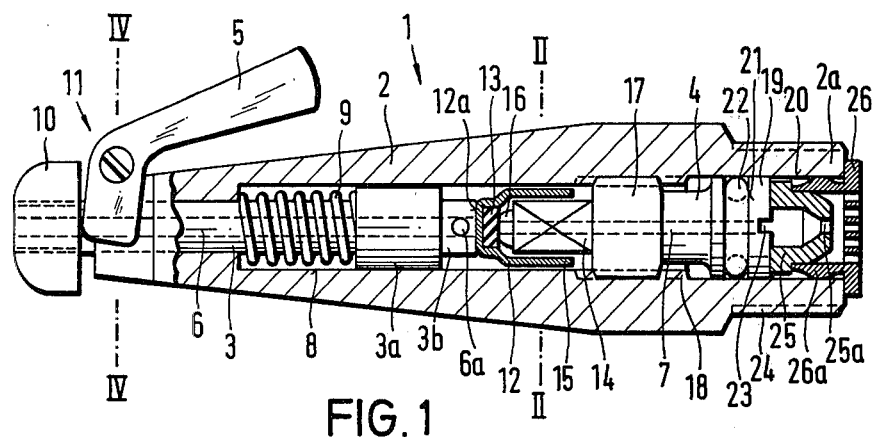
FIG. 1 is a diagrammatic sectional view through an automatically operable drinking fountain made in accordance with this invention.
Figure 4:
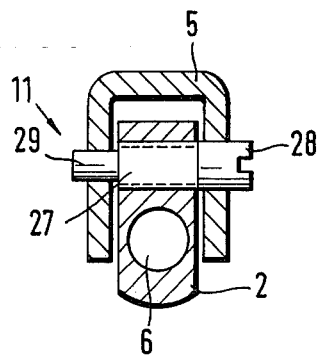
FIG. 4 is a sectional view along line IV—IV of FIG. 1 showing the control lever mounted on the tap housing.
Figure 2:
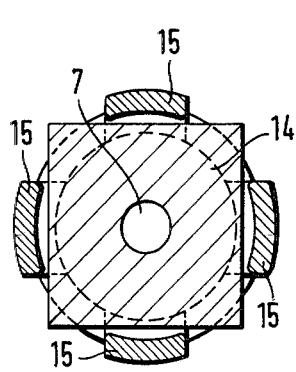
FIG. 2 is a sectional view along line II—II showing the interfitment of the valve-seating section and the valve basket in accordance with the invention.
Figure 3:
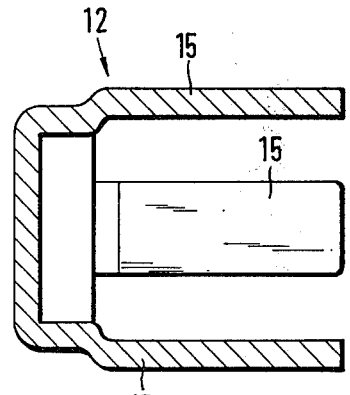
FIG. 3 is a longitudinal sectional view of the valve basket or spacer made in accordance with this invention.

The drinking fountain, generally designated 1, includes a tap-like housing 2, a valve stem or plunger 3, a stopper mechanism or valve seat carrier 4, and a control lever 5. The valve plunger 3 and stopper mechanism 4 include longitudinal bores 6 and 7, respectively, and feed pressurized drinking water to the dispensing end of the automatically-operable drinking tap. A transverse bore 6a is located in end portion 3b of plunger 3 also having a cylindrical portion 3a which slides in a bore 8 of tap housing 2. One end of a spring 9 abuts against plunger 3 and the other end of spring 9 is supported against the bore 8 of tap housing 2 as shown. An end nut 10 is disposed on the portion of valve plunger 3 which projects from tap housing 2. The lever bearing assembly 11 includes a control lever 5 having a shorter arm formed as an elbow lever which butts against end nut 10.

Sealing means including spacer or valve basket 12 and sealing member 13 is inserted between valve-seating section 14 and valve plunger 3. Spacer 12 is shaped as a recessed annular body and is supported to be non-rotatable with respect to valve-seating member 14. Sealing member 13 is composed of resilient material and faces valve seating member 14 adjacent valve seat 16. Space 12 includes a free end surface 12a which rests against the front surface of the reduced portion 3b of valve plunger 3. Thus, valve plunger 3 transmits only its thrust and not its angular momentum to spacer 12.

The spacer or valve basket 12 includes a plurality of axial extensions 15. Valve seat carrier or stopper mechanism 4 includes the valve seating section 14 having a plurality of planar side surfaces extending toward valve plunger 3. The side surfaces interact with extensions 15 which are pushed on and rest against the planar surfaces of valve setting section 14. Consequently, spacer or valve basket 12 slides axially onto section 14 and is non-rotatable with respect to the valve seat carrier 4.

In this particular embodiment, the valve seating section 14 has a square cross section. It is also possible that the cross section may be a three-sided bar or a polyhedral bar. The seating section 14 includes valve seat 16 which is somewhat rounded off at its end surface which contacts sealing member 13.

The valve seat carrier 4 includes a threaded portion 17 screwed into the tapped bore 18 of tap housing 2. Thus, the stopper mechanism or valve seat carrier 4 constitutes an independent screwed-in piece and includes a piston 19 which cooperates with bore 20 of tap housing 2. Piston 19 has an annular groove 21 which receives a gasket or O-ring 22 for sealing the outer periphery of valve seat carrier 4 with respect to bore 20. Thus, no secondary flow will develop around the outside of valve seat carrier 4.

Piston 19 includes a screw driver groove 23 at its end surface so that the stopper mechanism 4 may be adjusted about its axis within tap housing 2. Thus, it is possible to compensate for manufacturing tolerances with respect to the length of the valve stem 3 or the initial stress in spring 9.

The free end 2a of tap housing 2 includes a connecting screw thread around its outer periphery. A nozzle head 25 and a dirt filter 26 are disposed at the inlet end of tap housing 2 having a liquid inlet opening. A thicker portion 26a is located at the periphery of dirt filter 26 and lies in a sealing engagement against the inside wall of bore 20. The thicker portion 26a is a toroidal thickening. The sleeve portion of dirt filter 26 may be pushed onto nozzle head 25 to be fastened thereto so that the head 25 and filter 26 are firmly interconnected. The size of orifice 25a of nozzle head 25 controls the amount of water flowing into bores 6 and 7. Nozzle head 25 may be easily interchanged with another nozzle head with a smaller or larger jet orifice.

In operation, the drinking animal takes the elongated tap housing 2 directly and as fully as possible into its mouth. This enables the animal to move the free end of the control lever 5 easily with his teeth or the roof of its mouth. In doing so, valve plunger 3 is pulled outwardly from spacer or valve basket 12 when end nut 10 is pushed outwardly by the shorter arm of control lever 5. The water in bore 7 of valve seat carrier 4 is at the pressure of the main water system. Thus, the pressurized water pushes the spacer or valve basket 12 outwardly from valve seat 16 so that water flows no laterally past extensions 15 to the transverse bore 6a of bore 6 in valve stem 3. The water then proceeds through bore 6 of valve stem 3 and arrives at the free open end thereof directly deep within the animal's jaws. Upon release of control lever 5, sealing member 13 is pressed against seat 16 under pressure of spring 9 and plunger 3. Any possible rotational movement of valve plunger or stem 3 is avoided between the axially guided spacer 12 and sealing member 13 and valve seat 16.

A stepped-down threaded bolt 27 includes a journal 28 of relatively larger diameter and a journal 29 of relatively small diameter. Control lever 5 includes corresponding bearing eyes of different sizes in the side pieces thereof to fit over the corresponding journals 28 and 29. Thus, threaded bolt 27 serves as a bearing element for the reliable operation of control lever 5. The structure of the bearing element obviates any danger of the bearing axle from becoming loosened. Bearing element bolt 27 may be quickly and securely mounted. Furthermore, the force acting on the lever bearing of bolt 27 is uniformly distributed over the entire length of the screw thread thereof.

ADVANTAGES OF THE INVENTION

With this invention, it is unnecessary to fix the valve seat at a specific point within the casing. The adjustment of the most favorable valve closing position may be effected in a simple manner by screwing the stopper mechanism or valve seat carrier 4 into the bore of tap housing 2 so that an adjustment of the exact valve plunger length and the cooperation of the control lever 5 automatically is affected. Furthermore, manufacturing tolerances related to the construction of valve plunger 3 or with the pretension of spring 9 are easily compensated for through the use of the sealing mechanism disposed between plunger 3 and valve seat carrier 4. The valve basket 12 which receives sealing member 13 is protected against the action of angular momentums otherwise being exerted by the rotating valve plunger 3. Wear between sealing member 13 and valve seat 16 is eliminated, thereby obtaining excellent operating reliability of the drinking fountain of the invention.

While the Animal Drinking Fountain has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An animal drinking fountain comprising:
   (a) an elongated tap housing having a bore with a liquid inlet opening and a spring loaded valve plunger means movably disposed between an open and a closed position within said housing,
   (b) a valve operating means pivotally mounted on the tap housing to engage the valve plunger means,
   (c) valve seating means disposed between said valve plunger means and the liquid inlet opening of said housing and having a bore opened toward said valve plunger,
   (d) said valve seating means having a valve seat around said opened bore at the end thereof,
   (e) sealing means disposed between the valve plunger means and including spacer means supported on the valve seat to seal said open bore,
   (f) said spacer means having a structural configuration which is axially displaceable and prevents rotational movement with respect to the valve seating means.

2. A drinking fountain as defined in claim 1 wherein a nozzle means is positioned at the liquid inlet side of the elongated tap housing.

3. A drinking fountain as defined in claim 1 wherein filter means is positioned at the liquid inlet side of the elongated tap housing.

4. A drinking fountain as defined in claim 3 wherein the valve seating means includes a nozzle head disposed at the inlet end of the tap housing, and filter means as disposed at the inlet end of the tap housing outwardly from the nozzle head,
   the filter means includes a filter member and means located between the filter member and the nozzle head and being in sealing engagement against the inside wall of the bore of the tap housing.

5. A drinking fountain as defined in claim 1 wherein the valve seating means includes a threaded portion which is threadingly engaged with the tap housing bore, and a piston having a peripheral sealing member disposed in an annular groove around said piston.

6. A drinking fountain as defined in claim 1 wherein said valve seating means includes a plurality of planar side surfaces extending toward the valve plunger means,
   the spacer means includes axial extensions which extend along said planar surfaces of the valve seating means.

7. A drinking fountain as defined in claim 6 wherein the plurality of planar side surfaces form a pohyhedral member with the axial extensions of the spacer means extending along each said planar side surface.

8. A drinking fountain as defined in claim 1 wherein said sealing means includes a sealing member with the spacer means being effective to maintain the sealing member in position over the valve seat, said spring loaded valve plunger means being effective to apply a force to said sealing means to maintain the sealing member against the valve seat when the valve operating means is maintained in a closed position,
   said sealing member and spacer means being effective to move in a direction toward the valve plunger means when the valve operating means is moved to an open position to separate the sealing member from the valve seat and to allow the pressurized liquid to pass through the drinking fountain.

9. A drinking fountain as defined in claim 1 wherein the valve seat is rounded-off at said end around the open bore.

10. A drinking fountain as defined in claim 1 wherein the valve plunger includes a cylindrical shaft portion slidingly supported in the bore of said tap housing.

11. A drinking fountain as defined in claim 1 wherein said valve operating means includes a valve plunger operating lever supported on a threaded bolt,
    said bolt having two bearing journal parts stepped down in diameter with respect to each other.

12. An animal drinking fountain comprising:
    (a) an elongated tap housing having a bore with a liquid inlet opening and a spring loaded valve plunger means movably disposed between an open and a closed position within said housing,
    (b) a valve operating means pivotally mounted on the tap housing to engage the valve plunger means,
    (c) valve seating means disposed between said valve plunger means and the liquid inlet end opening of said housing and having a bore opened toward said valve plunger,
    (d) said valve seating means having a valve seat around said opened bore at the end thereof,
    (e) sealing means disposed between the valve plunger means and valve seat to seal said open bore, and
    (f) said sealing means including spacer means supported on and being axially displaceable with respect to the valve seating means,
    (g) said spacer means includes a recessed annular body having at least two legs integrally formed with said body and extending therefrom,
    (h) said legs rest on the valve seating means and a sealing member covers the valve seat which is directed toward the valve plunger means,
    (i) said legs resting on the surfaces of the valve seating means are effective to prevent rotational movement of the spacer means but allow movement in an axial direction with respect to the valve seating means.

13. A drinking fountain as defined in any one of the claims 1 to 8 wherein
    said valve operating means includes a valve plunger operating lever supported on a threaded bolt,
    said bolt having two bearing sections with different diameters at both ends thereof to form journal elements at the ends of said threaded bolt.

* * * * *